United States Patent [19]

Fischer et al.

[11] Patent Number: 4,503,728
[45] Date of Patent: Mar. 12, 1985

[54] STOP DEVICE

[75] Inventors: Günter Fischer, Freiberg; Wolfgang Kötter, Markgroeningen; Robert Laschke, Reifenberg, all of Fed. Rep. of Germany

[73] Assignee: Robert Bosch GmbH, Stuttgart, Fed. Rep. of Germany

[21] Appl. No.: 427,263

[22] Filed: Sep. 29, 1982

[30] Foreign Application Priority Data

Oct. 28, 1981 [DE] Fed. Rep. of Germany ....... 3142617

[51] Int. Cl.³ .............................................. G05G 1/04
[52] U.S. Cl. ...................................... 74/527; 74/531; 251/297; 248/188.8
[58] Field of Search ................ 74/527, 531, 493, 503; 24/211 N; 251/297; 403/328, 107; 248/188.8, 297.3

[56] References Cited

U.S. PATENT DOCUMENTS

| 1,125,415 | 1/1915 | Wade | 74/531 |
| 2,382,291 | 8/1945 | Carlberg | 403/107 |
| 3,045,498 | 7/1962 | Viezzoli | 74/527 X |
| 3,306,639 | 2/1967 | Lyon | 403/107 |
| 3,374,023 | 3/1968 | Hill et al. | 403/107 X |
| 3,473,406 | 10/1969 | Runkle | 74/493 |
| 3,570,322 | 3/1971 | Krouse | 74/531 X |
| 3,602,245 | 8/1971 | Meisel | 74/527 X |

Primary Examiner—James A. Leppink
Assistant Examiner—Frank H. McKenzie, Jr.
Attorney, Agent, or Firm—Michael J. Striker

[57] ABSTRACT

Disclosed is a click stop device assembled of three elongated securing units in the form of notched bars. The notched bars are disconnectably mounted to the inner circumference of supporting rings which surround an axially displaceable member provided with radially directed engaging balls. The cross section of the member and the corresponding contour of the supporting rings has hexagonal shape to prevent angular displacement.

5 Claims, 7 Drawing Figures

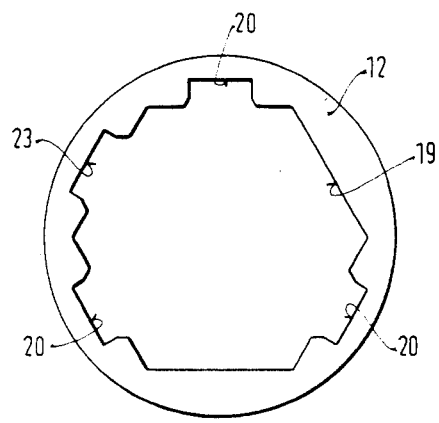
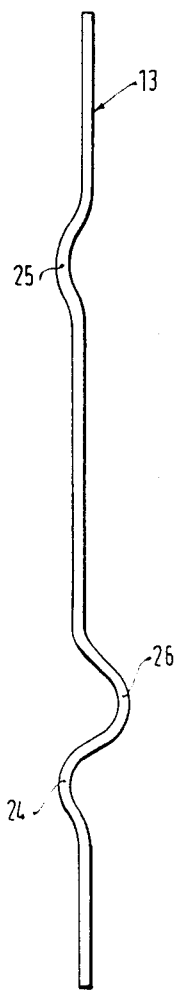
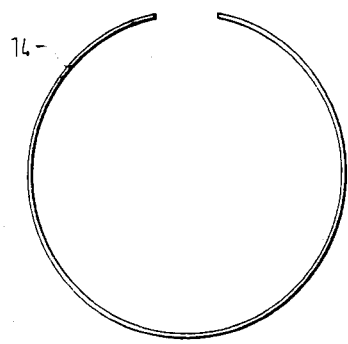

' 4,503,728

STOP DEVICE

BACKGROUND OF THE INVENTION

The present invention relates in general to a stop device, and in particular to a click stop device for axially displaceable parts, such as sliding spools of directional control valves or drilling spindles which are provided with radially movable engaging elements.

Known stop devices of this kind include a sleeve-like body fitted in a housing and having on its inner surface stop notches in the form of annular grooves. The disadvantage of such prior-art device is the fact that they are suitable for a precisely defined configuration of the movable parts and, moreover, they are relatively costly in manufacture and in material expenditures.

SUMMARY OF THE INVENTION

A general object of the present invention is to overcome the aforementioned disadvantages.

More particularly, an object of the invention is to provide a click stopping device which is substantially simpler in structure.

Another object of this invention is to provide such an improved device which is easy to manufacture, particularly as regards the stop notches.

In keeping with these objects and others which will become apparent hereafter, one feature of the invention resides in the provision of at least two securing units arranged parallel to each other in the direction of displacement of the member and cooperating with the radially movable engaging elements to stop the same and thus the member in predetermined position, and means for positively locking the securing units relative to each other to form a fixed guiding part for the member.

The advantages of this construction, in comparison with prior-art click stop devices, are attained by utilizing the space between securing units for additional functions, such as guiding of the axially displaceable member and for holding the securing units together.

Preferably, the locking means are composed of two holding rings the inner circumference of which has a hexagonal cross section for guiding a hexagonal axially displaceable member, the sides of the hexagon being formed with recesses for receiving the securing units, one of the securing units being in the form of an elongated spring provided with deformations corresponding to the stopping notches. The spring has the advantage that the force for operating the axially displaceable member can be adjusted independently of the remainder of the securing units.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIGS. 3–7 show on an enlarged scale individual component parts of the device of FIG. 1.

DESCRIPTION OF THE PREFERRED EMBODIMENTS

Figure 1:
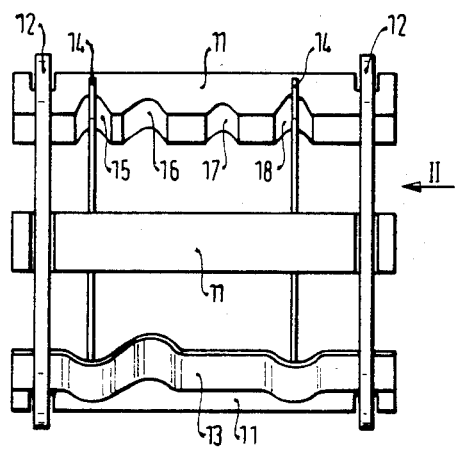
FIG. 1 is an elevational view of a click stop device of this invention.
Figure 2:
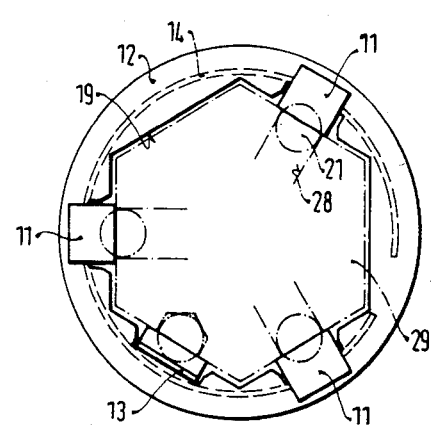
FIG. 2 is a side view of the device of FIG. 1.
Figure 3:
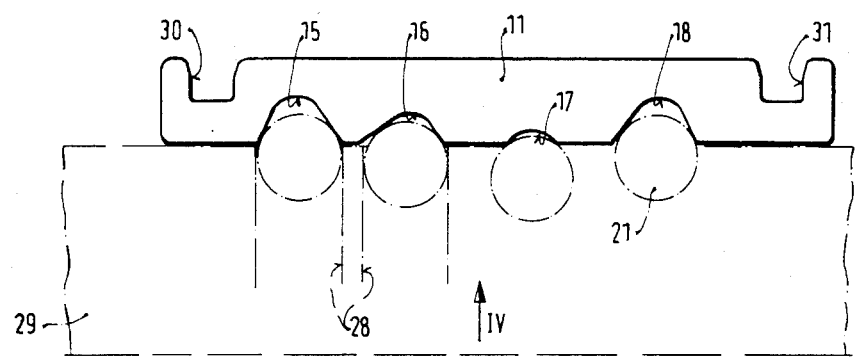
Figure 4:
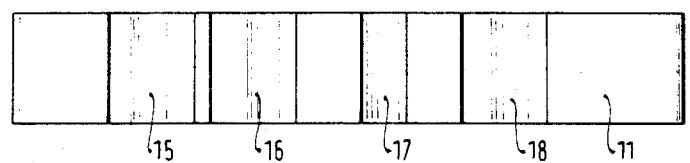

The click stop device illustrated in FIGS. 1 and 2 is assembled of a plurality of individual parts, namely of three identical securing plates 11, of two identical holding rings 12, an optional leaf spring 13, and two retaining rings 14. FIGS. 3 and 4 show a securing plate in detail. The plates consist of an elongated planar body of a rectangular cross section. One of its longitudinal sides is provided with a plurality of parallel notches 15–18 serving as stop grooves for three ball-shaped engaging elements 21, as will be explained below. The stop grooves have a substially V-shaped cross section with rounded apex and being of different depths. The opposite elongated side is formed at its end portions with locking grooves 30 and 31 of a rectangular cross section.

The notched securing plates 11 are held together by means of two holding rings 12. The inner periphery of each holding ring has a hexagonal configuration 19. Three spaced sides of the hexagon are provided with rectangular recesses 20 matching the recesses 30 and 31 of respective securing plates 11. Upon insertion of recesses 30 and 31 into corresponding recesses 20 in holding rings 12, resilient retaining rings 14 are inserted into the apex regions of deeper grooves 15 and 18 in the securing plates 11, so that the latter are radially biased outwardly against the recesses 20. In this manner, a pre-assembled click stop device is obtaind which can be easily dismantled and stored and again assembled and installed on an axially movable member provided with the aforementioned engaging balls 21. In this example, the axially movable member to be stopped in predetermined positions corresponding to respective notches, is a hexagonal body 29 indicated in FIG. 2 by dash-and-dot lines. Every second side of the hexagon is formed with radially directed blind bores 28 in which the engaging balls 21 are guided and loaded against the notched face of the assigned plates 11. The hexagonal configuration both of the holding rings 12 and of the axially slidable member 29 prevents angular displacement of these two parts relative to each other, so that the engaging balls are always situated in the plane of the arresting notches.

The optional leaf spring 13 illustrated in FIG. 6 is held in position in an additional rectangular recess 23 of each holding ring 12. The leaf spring is shaped with two outwardly directed bucklings 24 and 25 for accommodating the retaining rings 14 and with an inwardly directed buckling 26. An additional engaging ball is in contact with the leaf spring 13 and the inwardly directed buckling 26 constitutes a point of increased pressure which is detectable by the operator during the shifting of the member 29. This leaf spring is applicable for special cases of the click stop device only, and for other applications it can be dispensed with.

The above described click stop device has the advantage that securing notches or grooves 15–18 are machined in a planar component part, which can be easily manufactured and readily adjusted to particular requirements. The holding rings 12 fix the securing plates both axially and radially and counteract the force exerted by radially loaded engaging balls 21. The angular displacement between the movable and fixed parts is prevented simply by the hexagonal configuration of the mating surfaces of the parts. The space between the securing plates can be utilized for other functions of the sliding member.

It will be understood that each of the elements described above, or two or more together, may also find a useful application in other types of constructions differing from the types described above. For example, the securing plates can be replaced by elongated bodies having the shape of circular segments, or instead of the holding rings it is possible to use another component, such as a sleeve provided with axially directed grooves for receiving the securing plates.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A stop device for an axially displaceable member such as a sliding spool of a directional control valve, a drilling spindle, and the like, comprising at least two engaging elements guided in said member for movement transverse to the direction of displacement of the member; at least two securing units arranged parallel to each other in the direction of displacement of the member and cooperating with said engaging elements to stop said member in predetermined position; means for positively locking said securing units relative to each other to form a fixed guiding part for said member; each securing unit being in the form of an elongated notched plate having one elongated side formed with securing notches directed transversely to the elongated side; a side of said elongated notched plate opposite to said notches being formed with locking recesses; said locking means including at least one supporting member surrounding said securing units and said axially movable member; and said supporting member being assembled of at least two holding rings each having an inner side formed with locking recesses matching the locking recesses in said securing units.

2. A stop device for an axially displaceable member such as a sliding spool of a directional control valve, a drilling spindle, and the like, comprising at least two engaging elements guided in said member for movement transverse to the direction of displacement of the member; at least two securing units arranged parallel to each other in the direction of displacement of the member and cooperating with said engaging elements to stop said member in predetermined position; means for positively locking said securing units relative to each other to form a fixed guiding part for said member; each securing unit being in the form of an elongated notched plate having one elongated side formed with securing notches directed transversely to the elongated side; a side of said elongated notched plate opposite to said notches being formed with locking recesses; and said locking means includes at least one supporting member surrounding said securing units and said axially movable member.

3. A stop device as defined in claim 2, comprising three securing units in the form of notched plates uniformly arranged parallel to each other, sand said positively locking means including two holding rings provided on its inner circumference with locking notches engaging said notched plates; and each of said notched plates being formed with a plurality of securing notches.

4. A stop device for an axially displaceable member such as a sliding spool of a directional control valve, a drilling spindle, and the like, comprising at least two engaging elements guided in said member for movement transverse to the direction of displacement of the member; at least two securing units arranged parallel to each other in the direction of displacement of the member and cooperating with said engaging elements to stop said member in predetermined position; means for positively locking said securing units relative to each other to form a fixed guiding part for said member; each securing unit being in the form of an elongated notched plate having one elongated side formed with securing notches directed transversely to the elongated side; a side of said elongated notched plate opposite to said notches being formed with locking recesses; said locking means including at least one supporting member surrounding said securing units and said axially movable member; said supporting member being assembled of at least two holding rings each having an inner wall formed with locking recesses matching the locking recesses in said securing units; said inner wall of each of said holding rings having a hexagonal cross section defining six sides; every second side of the hexagonal cross section being formed with said locking recesses and further including an additional recess for receiving a leaf spring extending over the entire length of said securing units and defining an inwardly bent portion which cooperates with an additional engaging element in said member to provide a point of increased pressure during the axial movement of said member.

5. A stop device for an axially displaceable member such as a sliding spool of a directional control valve, a drilling spindle, and the like, comprising at least two engaging elements guided in said member for movement transverse to the direction of displacement of the member; at least two securing units arranged parallel to each other in the direction of displacement of the member and cooperating with said engaging elements to stop said member in predetermined position; means for positively locking said securing units relative to each other to form a fixed guiding part for said member; each securing unit being in the form of an elongated notched plate having one elongated side formed with securing notches directed transversely to the elongated side; a side of said elongated notched plate opposite to said notches being formed with locking recesses; said locking means including at least one supporting member surrounding said securing units and said axially movable member; said supporting member being assembled of at least two holding rings each having an inner wall formed with locking recesses matching the locking recesses in said securing units; and further comprising at least two resilient retaining rings accommodated in corresponding notches of said securing units and exerting radially directed pressure against said units.

* * * * *